US008987635B2

(12) United States Patent
L'Arvor et al.

(10) Patent No.: US 8,987,635 B2
(45) Date of Patent: Mar. 24, 2015

(54) AUTOMATIC MECHANICAL GUIDE SYSTEM FOR ONE OR MORE WELDING UNIT TORCHES WITH THREE PIVOT AXES FOR THE TORCH(ES)

(75) Inventors: Eric L'Arvor, Villers Cotterets (FR); Denis Destouches, Dampieux (FR)

(73) Assignee: Serimax, Mitry Mory (FR)

( * ) Notice: Subject to any disclaimer, the term of this patent is extended or adjusted under 35 U.S.C. 154(b) by 704 days.

(21) Appl. No.: 13/266,797

(22) PCT Filed: Apr. 28, 2010

(86) PCT No.: PCT/EP2010/055733
§ 371 (c)(1),
(2), (4) Date: Jan. 30, 2012

(87) PCT Pub. No.: WO2010/125112
PCT Pub. Date: Nov. 4, 2010

(65) Prior Publication Data
US 2012/0118864 A1     May 17, 2012

(30) Foreign Application Priority Data
Apr. 29, 2009   (FR) ...................... 09 52809

(51) Int. Cl.
*B23K 9/12*     (2006.01)
*B23K 9/127*    (2006.01)
*B23K 37/02*    (2006.01)

(52) U.S. Cl.
CPC ........... *B23K 9/1278* (2013.01); *B23K 37/0217* (2013.01); *B23K 37/027* (2013.01); *B23K 37/0276* (2013.01); *B23K 37/0282* (2013.01)
USPC ..................................... 219/124.1; 219/124.4

(58) Field of Classification Search
CPC ........ B23K 37/0211–37/0217; B23K 37/0276; B23K 9/0282–9/0288
USPC ............................... 219/124.1–126
See application file for complete search history.

(56) References Cited

U.S. PATENT DOCUMENTS 2,670,423 A * 2/1954 Darner et al. ............... 219/60 R
3,084,246 A    4/1963 Rieppel et al.
(Continued)

FOREIGN PATENT DOCUMENTS

DE    27 33 035     2/1979
EP    0 439 975     8/1991
(Continued)

OTHER PUBLICATIONS

International Search Report Issued Jul. 14, 2010 in PCT/EP10/055733 Filed Apr. 28, 2010.

*Primary Examiner* — Sang Y Paik
(74) *Attorney, Agent, or Firm* — Oblon, McClelland, Maier & Neustadt, L.L.P.

(57) ABSTRACT

A mechanical system for automatic guiding of one or more torches of a welding unit in a groove delimited by chamfered end surfaces of two metal parts to be welded together, including a main carriage moving along a stationary guide relatively parallel to the groove, a secondary carriage that is connected to the main carriage by a hinged linking assembly and that includes a torch supporting unit and a guiding device including bearing members in contact with the surfaces of the metal parts bordering the groove and sensing members that enter the groove. The hinged linking assembly includes three pivoting axis.

12 Claims, 8 Drawing Sheets

(56) References Cited

U.S. PATENT DOCUMENTS

| | | | |
|---|---|---|---|
| 3,737,614 A | * | 6/1973 | Paulange .................... 219/60 A |
| 3,777,115 A | * | 12/1973 | Kazlauskas et al. ..... 219/124.34 |
| 4,331,278 A | * | 5/1982 | Sherer et al. .................... 228/29 |
| 5,146,064 A | | 9/1992 | Poirier |
| 5,227,601 A | * | 7/1993 | Black .............................. 219/61 |
| 5,981,906 A | * | 11/1999 | Parker .................... 219/137 PS |

FOREIGN PATENT DOCUMENTS

| | | |
|---|---|---|
| JP | 51 123753 | 10/1976 |
| JP | 2001 276973 | 10/2001 |

\* cited by examiner

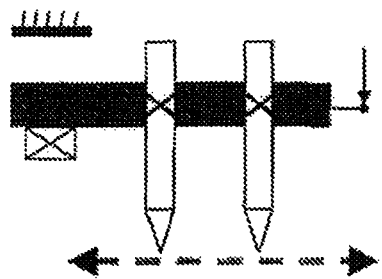
Fig 9 a
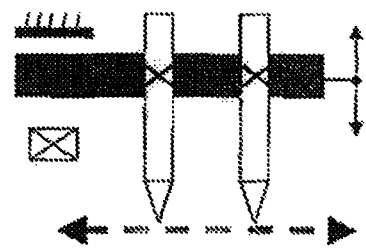
Fig 9 b
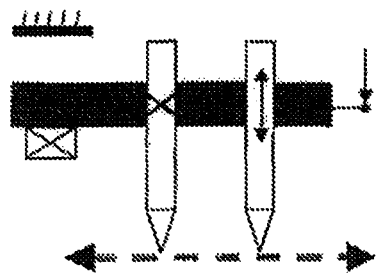
Fig 9 c
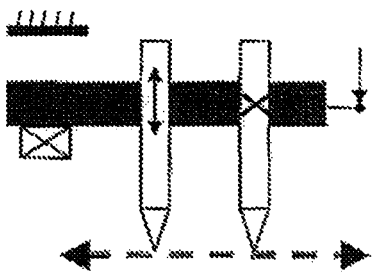
Fig 9 d
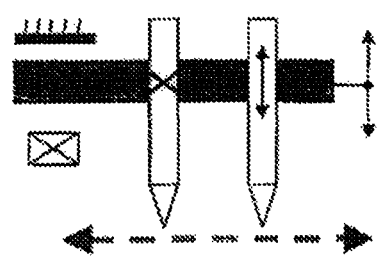
Fig 9 e
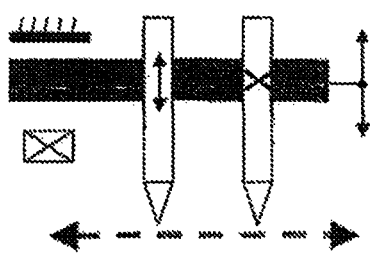
Fig 9 f
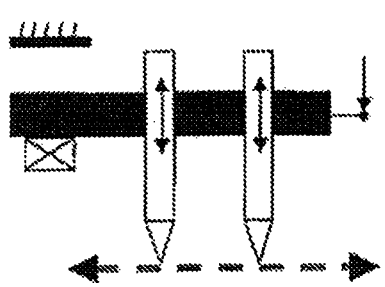
Fig 9 g
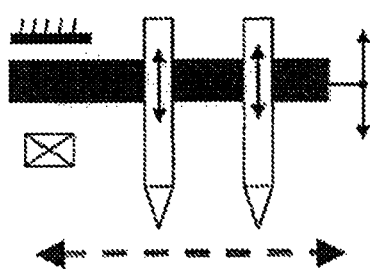
Fig 9 h
 Mechanical stop
 Upper stop (parked)
 Direction of welding
 Movable up and down
 Mechanical stop cylinder

AUTOMATIC MECHANICAL GUIDE SYSTEM FOR ONE OR MORE WELDING UNIT TORCHES WITH THREE PIVOT AXES FOR THE TORCH(ES)

BACKGROUND

The present invention relates to an automatic mechanical guide system for one or more torches of a welding unit, for example an arc-welding unit, in a groove delimited between the two bevelled end surfaces of two metal parts to be welded together, of the type comprising a main bug that moves along a fixed guide substantially parallel to the groove, a secondary bug hinged and attached to the main bug and equipped with a torch holder and a guide device comprising roller components in contact with the surfaces of the metal parts bordering the groove and tracer components that enter the groove, said device comprising two tracer components that are respectively in contact with the two side walls of the groove and are respectively located towards the front and rear of the secondary bug in the direction of movement of the main bug.

Generally, an automatic welding machine involves a large number of operating parameters linked to the welding process used, the geometric characteristics of the groove delimited between the two parts to be welded and the welding conditions (nature, shape and position of the parts, etc.). In most industrial applications, the welding operation takes place in several passes, and obtaining a high-quality weld depends on the accuracy with which the first pass is made. It is therefore important that the end surfaces that delimit the groove between them are machined as evenly as possible and that a system capable of following the geometry of the groove is obtained so that the weld is applied very accurately in the bottom of and along the axis of the groove.

It is common practice to machine a bevel at the two ends of the parts to be welded. Depending on the angle of the bevel, the groove obtained is flared to a greater or lesser extent; a wide groove increases the number of passes and the welding time and a narrow groove, while it does not present these drawbacks, also poses problems of accuracy for the guide system.

Thus, even with such machining, the groove delimited by the two bevels cannot have constant geometric characteristics along its entire length. Once the two end surfaces have been placed opposite each other, the manufacturing tolerances of the parts and the machining tolerances of the bevels will necessarily lead to variations in width and depth in the groove. If the two parts to be welded are relatively long tubes, for example, with a bevel machining tolerance of +/−0.1 mm, this results in a groove width to within +/−0.2 mm with depth of 2 to 3 mm due in particular to the ovalisation of the tubes.

If the welding process is gas-shielded electric arc welding, the welding electrodes held by the torches must enter the groove and be located a given distance from the walls and the bottom of the groove or the last weld layer deposited. Under these conditions, the accuracy of the guide system is particularly important, especially when this welding process is used in a narrow groove.

Consequently, the accuracy of the weld, particularly on the first pass, involves accurate positioning of the welding electrodes, not only relative to the mid-plane of the groove, but also relative to the bottom of the groove. The more accurate the guide system, the more these two positions, respectively sensitive to variations in groove width and depth, will be observed.

To this end, EP 0439975 proposes a guide system that can accurately ensure the positioning of the welding torches inside the groove and is capable of taking into account the width and depth variation of the groove and thus improve the quality of the weld required in certain applications, particularly for the end-to-end welding of sections of tube forming pipelines.

Thus, the automatic mechanical guide system for one or more torches on an arc welding unit in a groove delimited by the bevelled end surfaces of two metal parts to be welded together, of the type comprising a main bug that moves along a fixed guide parallel to the groove, a secondary bug that is connected to the main bug by a jointed connecting assembly and is equipped with a torch holder and a guide device comprising roller components in contact with the surfaces of the metal parts bordering said groove and tracer components that enter into the groove. The guide device comprises a first tracer and roller assembly that is located at the front of the secondary bug in the direction of movement of the main bug and comprises a front tracer component in contact with one of the two side walls of the groove and a front roller component rolling on the surface of one of the two metal parts on one side of the groove. The device also comprises a second tracer and roller assembly that is located at the rear of the secondary bug and comprises a rear tracer component in contact with the other side wall of the groove and a rear roller component rolling on the surface of the other metal part on the other side of the groove. The torch(es) are then mounted on the secondary bug so that they are between the first and second tracer and roller assemblies. The jointed connecting assembly comprises a first pivot axis that is perpendicular to the direction of movement of the main bug and is located in a plane parallel to the mid-plane of the groove and a second pivot axis that is perpendicular to the direction of movement of the main bug and perpendicular to the mid-plane of the groove, the first and second pivot axes being located between the first and second tracer and roller assemblies. Lateral pushing means are also provided that act on the secondary bug to urge it to pivot about the first axis so that each tracer component remains in contact with the associated wall of the groove and pushing means that constantly urge the roller components on the second bug against the metal parts respectively associated with them.

Through these different positions, the torches being arranged between the tracer components, only a small proportion of the width and depth variations of the groove are passed on to the welding electrodes so that their deviation relative to the mid-plane and the bottom of the groove is reduced to a minimum, which implies improved following of the geometric characteristics of the groove and improved accuracy of the weld.

However, it has been noted during operation that during the positioning of the secondary bug on the join plane, the machine axis is sometimes not perpendicular to the axis of the join plane, or the machine axis is sometimes not concentric with the axis of the tubes to be welded. The secondary bug is then moved along the join plane without the tracer and roller assemblies being effective, or it is necessary to reposition the entire welding device.

BRIEF SUMMARY

Thus, the object of the invention is to propose a system of the type described above in which accurate welding torch positioning is obtained but which also compensates for the inaccurate positioning of the secondary bug to be overcome when it is lowered onto the join plane, particularly to align the axis of the torches with the axis of the join plane even when the axis of the machine is not perpendicular to the axis of the join plane (bevel cuts) or when the machine axis is not concentric with the axis of the tubes (different tube diameters).

To this end, the object of the invention is an automatic mechanical guide system for one or more torches of a welding unit in a groove delimited by the bevelled end surfaces of two metal parts to be welded together, of the type comprising a main bug that moves along a fixed guide parallel to the groove, a secondary bug that is connected to the main bug by a jointed connecting assembly and is equipped with a torch holder and a guide device comprising roller components in contact with the surfaces of the metal parts bordering said groove and tracer components that enter into the groove, the device comprising a first tracer and roller assembly that is located at the front of the secondary bug in the direction of movement of the main bug and comprises a front tracer component in contact with one of the two side walls of the groove and a front roller component rolling on the surface of one of the two metal parts on one side of the groove and a second tracer and roller assembly that is located at the rear of the secondary bug and comprises a rear tracer component in contact with the other side wall and a rear roller component rolling on the surface of the other metal part on the other side of the groove, the torch(es) then being mounted on the secondary bug so that they are between the first and second tracer and roller assemblies, the jointed connecting assembly comprising a first pivot axis is that is perpendicular to the direction of movement of the main bug and is located in a plane parallel to the mid-plane of the groove and a second pivot axis that is perpendicular to the direction of movement of the main bug and perpendicular to the mid-plane of the groove, the first and second pivot axes being located between the first and second tracer and roller assemblies, lateral pushing means being provided that act on the secondary bug to urge it to pivot about the first axis so that each tracer component stays in contact with the associated wall of the groove and pushing means that constantly urge the roller components on the secondary bug against the metal parts respectively associated with them, characterised in that the connecting assembly also comprises a third pivot axis that is perpendicular to the direction of movement of the main bug and is located in a plane parallel to the mid-plane of the groove, said third pivot axis being outside the torch holder and pushing means being provided that act on the secondary bug to urge it to pivot about the third axis so that the axis of the torch(es) can be aligned with the axis of the join plane and the secondary bug can then return to its original position.

Thus, advantageously, when the secondary bug is brought in line with the bevel axis and is offset relative to this axis, the third pivot axis can be used to position the secondary bug on said bevel axis while the pushing means permit the pivoting and allow the secondary bug to return to its original position after each welding operation.

It is understood that when an axis is defined relative to the mid-plane of the groove, this is an ideal reference situation for the mechanical guide system of the invention relative to the join plane, and the pivot axes defined compensate for a non-ideal situation.

According to a preferred embodiment, the jointed connecting assembly comprises a connecting arm holding the secondary bug above the groove at one end, and the opposite end of which is mounted on the main bug by means of a hub, said arm being mounted pivoting on the hub about the third pivot axis perpendicular to the direction of movement of the main bug.

This third pivot axis is therefore outside the holder of the torch(es) while lateral pushing means are provided that act on the arm to urge it to pivot about the third axis around its original position.

Furthermore, by means of the hub, the connecting arm is mounted pivoting on the main bug about a fourth axis, perpendicular to the join plane and the direction of movement of the main bug, it being possible to pivot said connecting arm in a plane substantially parallel to the mid-plane of the groove between a position in which it is lowered to bring the secondary bug onto the join plane to perform a weld and a position in which it is raised once the weld is complete.

Thus, when the secondary bug is lowered onto the axis of the bevel using the connecting arm, even if the axis is slightly offset relative to the axis of the arm so that the axis of the tracer and roller means is also slightly offset relative to the axis of the bevel, the pivoting of the arm about the third pivot axis allows for the alignment of the axis of the tracer and roller means, which are thus housed in the groove, and therefore the axis of the torch(es), with the axis of the bevel. Once the weld is complete, the pushing means allow the connecting arm to return to its original position when it is raised.

The plane of the bevel may not be entirely perpendicular to the axis of the pipeline under construction, for example if the alignment of the two tubular components to be connected forms a groove that is not perpendicular to the tubular components to be assembled. Thus, if the welding device is positioned perpendicular to the pipeline and the groove is not perpendicular to the pipeline, it will still be possible to follow the join using the mechanical guide system of the invention, the third pivot axis at the hub allowing for the torches to be aligned on the join plane.

Similarly, the linear alignment of the tubes to be assembled may not be obtained due to geometric constraints or a linear weld located on the upper part. In this case, the tubes are not aligned and the welding device may not be perpendicular to the tubes or even concentric with them. However, the join can still be followed, the third pivot axis allowing for compensation for the misalignment by pivoting the connecting arm on the hub, and the lowering of the arm onto the join plane restores concentricity.

In a preferred embodiment, the secondary bug also has a holder for at least one welding torch, said holder being mobile relative to the secondary bug so that the penetration depth of the at least one welding torch into the groove can be adjusted after each weld pass.

Very advantageously, the automatic mechanical guide system for one or more torches of a welding unit in a groove delimited by the bevelled end surfaces of two metal parts to be welded together according to the invention also allows for the proposal of the use of two welding torches independent from each other.

According to a preferred variant, the holder holds two welding torches, one of said welding torches being fixed relative to the holder and the other welding torch being mobile relative to the holder so that the penetration depth of said torch can be adjusted independently of the fixed torch.

The present invention therefore proposes using at least two torches mechanically connected by the holder, for example in a single welding nozzle and therefore in the same gas shield, but mounted so that they can move up and down independently and are therefore independent in terms of electric arc height where there are electrodes for arc welding. Their automatic controls, such as management of altitude or wire length fed, are independent, and the control laws are therefore separate and the gains are variable. It is therefore possible to combine welding processes with different reaction speeds to the environment within a single welding nozzle.

The mechanical guide system according to the invention advantageously enables the use of such a welding head provided with two torches that are each governed by variable control laws that can be configured for each weld pass. The guide system according to the invention allows for full control of the centering of the torches and makes it possible to propose a reference system relative to the edges of the known bevel.

Of course, the present invention also applies to welding torches that operate independently of each other and which can also be independent from a mechanical point of view, i.e. held by independent mechanical holders. Similarly, with regard to the gas shield, provision can be made for the use of a separate shield for each torch or a single gas shield by means of a mono-nozzle and mobile side flanges, or any other form of implementation of an appropriate gas shield.

When the welding torches are held by the same holder, it is possible to have two types of mechanism. In a first type, the first torch or initial torch is the torch fixed to the holder, which allows for an approach movement and height management, to adjust the wire height fed for a MIG process, to adjust the workpiece-electrode distance for a TIG process, and to adjust the laser altitude for a laser process, while the second torch is the mobile torch, the relative movement of which independently of the movement of the first torch allows for height management as mentioned above.

In the second type, the second torch is the fixed torch, which allows for an approach movement and management of the wire height fed while the first torch is the mobile torch, the independent movement of which provides management of the wire fed.

BRIEF DESCRIPTION OF THE DRAWINGS

The invention will now be described in more detail with reference to the drawing, in which:

FIGS. 9a to 9h each diagrammatically show a holder according to variant embodiments of a holder according to the invention.

DETAILED DESCRIPTION

Figure 1:
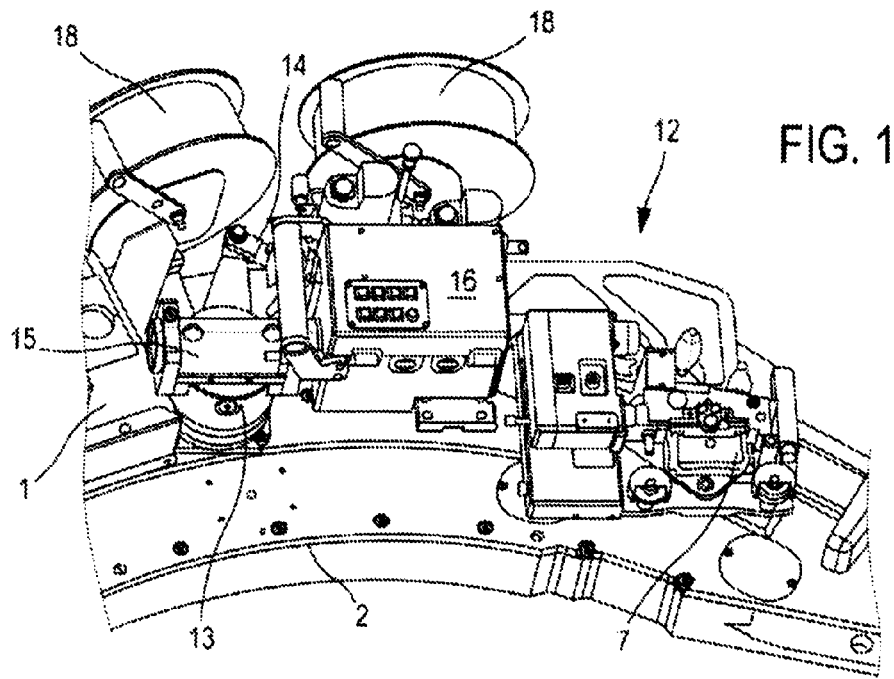
FIG. 1 shows a general view of a guide system according to the invention.
Figure 2:
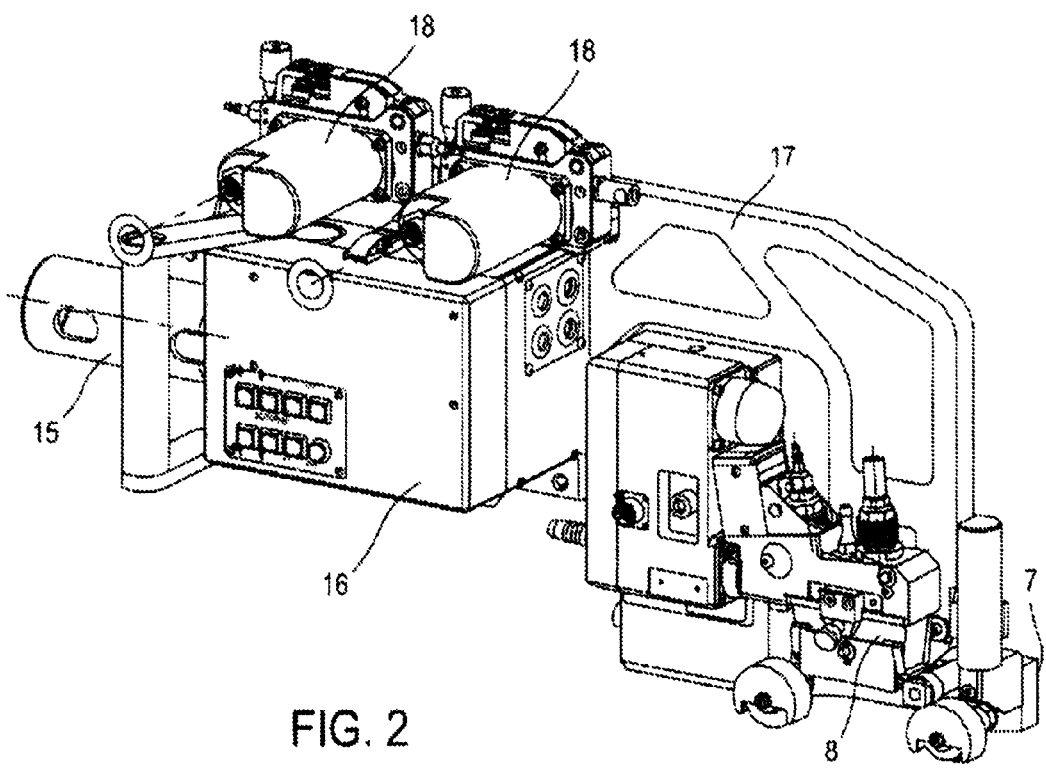
FIG. 2 shows a front perspective view of a connecting arm-secondary bug assembly.
Figure 3:
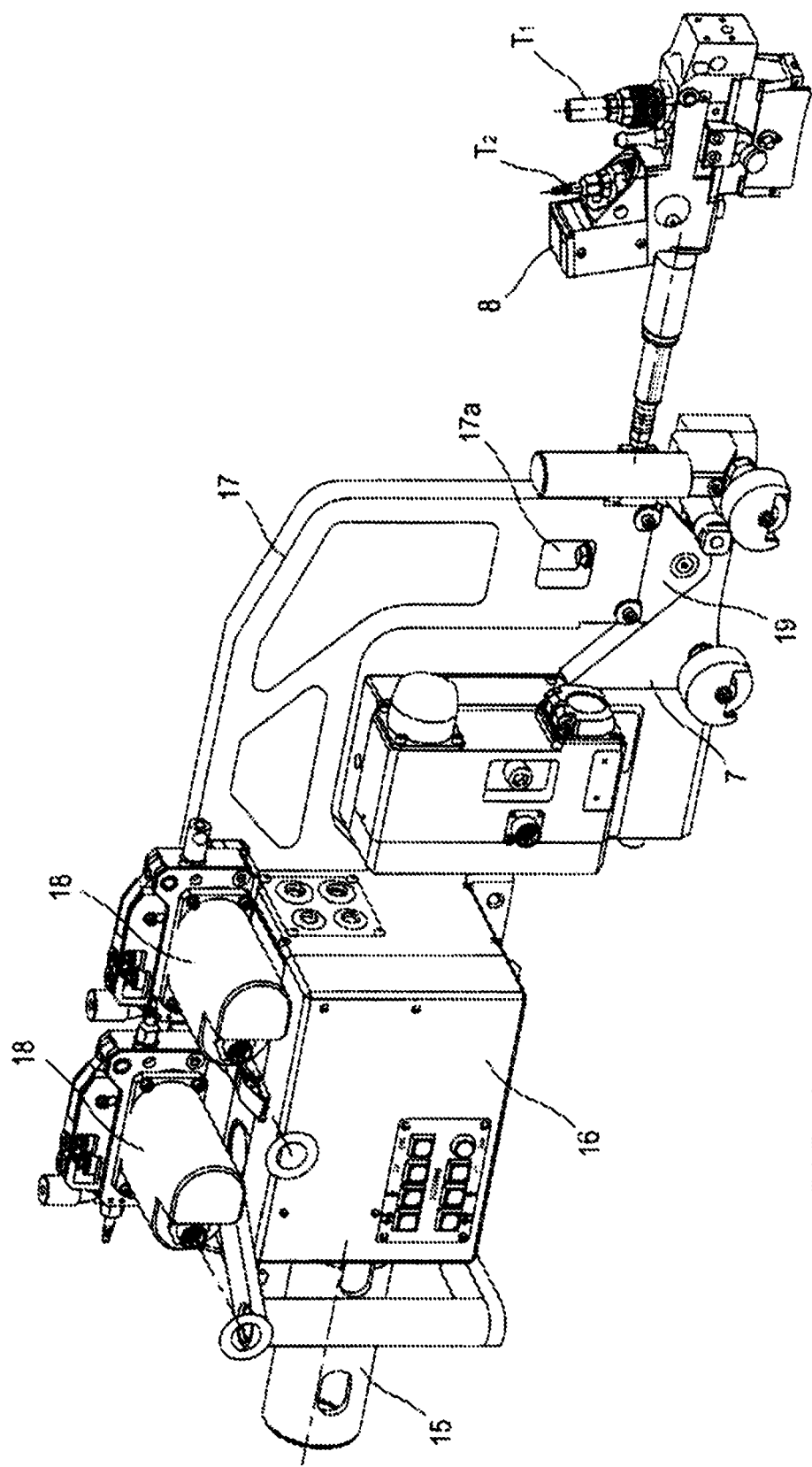
FIG. 3 shows a side perspective view of the assembly in FIG. 2, with the holder separated from the arm.
Figure 4:
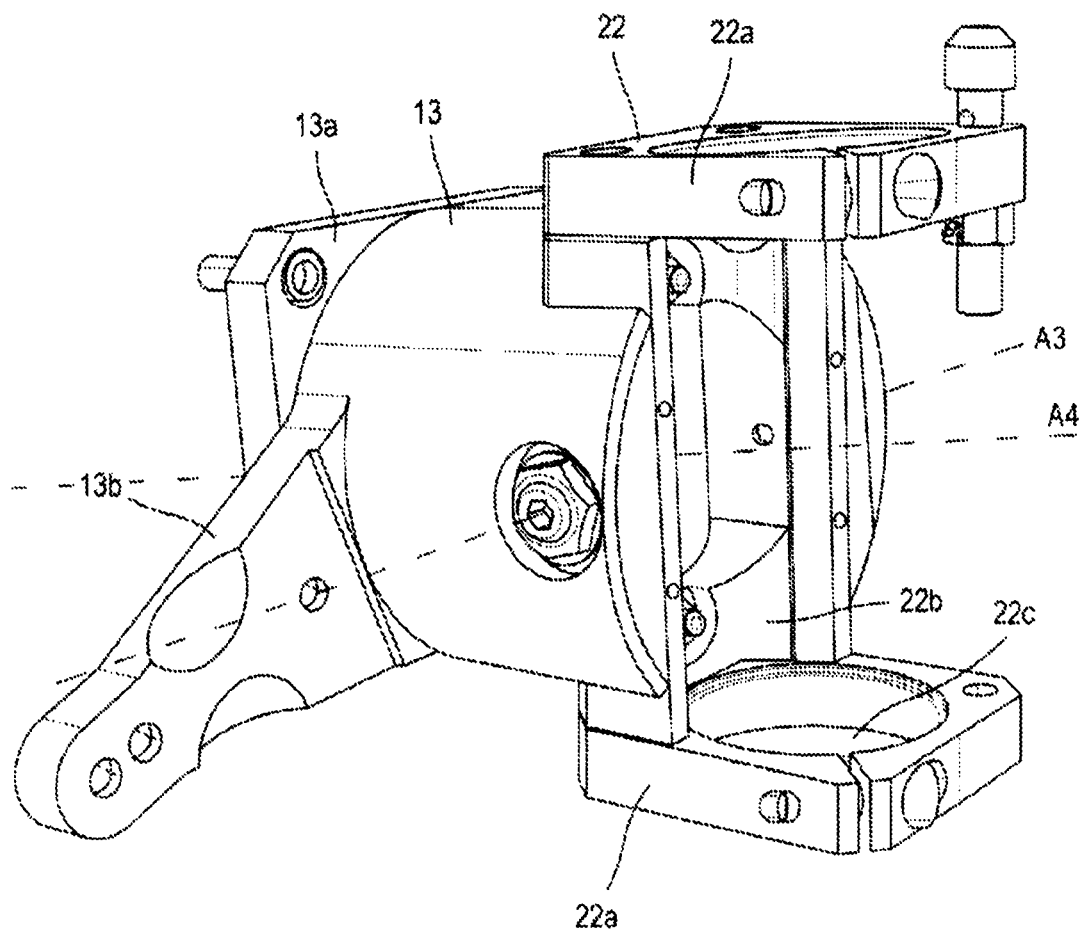
FIG. 4 shows a side perspective view of a hub for securing the arm to the main bug.

The automatic mechanical guide system for torches of a welding unit as diagrammatically shown comprises a bug 1 known as the main bug that moves on a circular guide 2 parallel to the circular groove 3, delimited by the two bevelled end surfaces of two metal tubes 4, 5 to be welded together. A bug 7 known as the secondary bug is connected by a connecting assembly to the main bug 1 and holds a holder 8 for two torches 9 forming a welding unit.

The secondary bug 7 is fitted with a mechanical guide device comprising tracer components 10a, 10b and roller components 11a, 11b. The two tracer components 10a, 10b are offset relative to each other and are respectively located 10a at the front of the secondary bug 7 and the other 10b at the rear in the direction of movement D of the main bug 1. The same applies to the position of the two roller components 11a, 11b.

The connecting assembly used to connect the secondary bug 7 and the main bug 1 forms a connecting arm 12 one end of which is mounted so that it can be pivoted on the main bug 1 and the other end of which holds the secondary bug 7.

The connecting arm 12 is mounted on the main bug 1 by means of a hub 13 allowing for said arm 12 to be pivoted between a lowered position of the welding unit on the groove 3 between the tubes 4, 5 for a welding operation and a raised position of said welding unit when there is no more welding. This hub 13 can therefore be rotated in a plane parallel to the mid-plane of the groove 3 using means of rotation such as a cylinder 14. This cylinder 14 is for example pneumatic but an electric or hydraulic actuator can also be used.

The connecting arm 12 holding the secondary bug 7 is made up of an arm portion 15 connected to a control unit 16 on which is mounted a bracket 17 holding the secondary bug 7. The control unit 16 is moreover configured to hold the fastenings for the filler wire (filler metal) feeders 18.

The guide device held by the secondary bug 7 is jointed on two pivot axes A1, A2 perpendicular to each other. The axis A1 is perpendicular to the direction of movement D of the main bug 1 and is located in a plane parallel to the mid-plane of the groove 3 so that the guide device can pivot about this axis A1 to enable the tracer components 10a, 10b to follow the geometry of the walls of the groove 3.

The end of the bracket 17 forms a connecting part resting on the base 19a of a stirrup 19. The pivot axis A1 of the guide device is formed by a pivot one end of which is integral with the base 19a of the stirrup 19 and extends perpendicular to it. The pivot shaft A1 passes through a bearing housed in a hole made in end of the bracket 17 so that its free end opens out into a central opening 17a in the bracket 17. The free end of the pivot shaft A1 is threaded to receive a nut 21 and thus axially immobilise the pivot shaft A1.

The axis A2 is perpendicular to the mid-plane of the groove 3 so that the guide device can pivot about this axis A2 to enable the roller components 11a, 11b to follow the geometry of the surfaces of the parts bordering the groove 3.

The pivot shaft A2 of the guide device perpendicular to the axis A1 is held by the two flanges 19b of the stirrup 19, and a plate 7a of the secondary bug 7 that holds the guide device is jointed on the pivot shaft A2. Thus, the guide device can pivot on the one hand directly about the axis A2 and on the other hand inside the bearing by means of the stirrup 19 and the axis A1.

The secondary bug 7 is constantly subject to thrusts that are passed on respectively to the tracer components 10a, 10b and the roller components 11a, 11b.

Thus, the stirrup 19 holds at its base, between the two flanges of the stirrup 19, a lever arm 20a protruding perpendicular to the axis A1 and extending in a plane perpendicular to the plane in which the axis A1 extends. The end of the bracket 17 comprises a pushing component 20b extending perpendicular to the lever arm 20a in the same plane. This pushing component 20b therefore exerts thrust on said lever arm 20a, making the stirrup 19 rotate about the axis A1 while stops 22 (screw/washer) fixed to the end of the bracket 17 limit the rotational movement of the stirrup 19.

When it lowers the connecting arm 12 onto the join plane, the cylinder 14 exerts a force on the secondary bug so that it is constantly pushed by means of the roller components 11a, 11b on the guide device onto the parts 4, 5.

Moreover, the guide system is jointed along a third pivot axis A3 perpendicular to the direction of movement of the main bug 1 and parallel to the mid-plane of the groove 3, said axis A3 outside the torch holder 8 and also outside the secondary bug 7 being located level with the hub 13 holding the connecting arm 12 on the main bug 1. This hub 13 is mounted so that it can be rotated about a pivot axis A4 on the main bug 1 by means of a fixing plate 13a and has on its periphery a radially protruding lug or tab 13b at the end of which is mounted the end of the rod of a cylinder 14, the actuation of the cylinder 14 moving the end of the protruding lug 13b in translation and causing the hub 13 to be rotated relative to the main bug 1 about the axis A4.

This hub 13 also holds a stirrup 22 the flanges 22a of which respectively have an aperture 22b in which is housed one end of the arm 12 holding at its other end the secondary bug 7. The base 22b of the stirrup 22 is also fixed to the hub 13 so that it pivots about said third pivot axis A3, pushing means such as springs 23 being provided that act on the base 22b of the stirrup 22 to urge it to pivot about said third axis A3.

Figure 5:
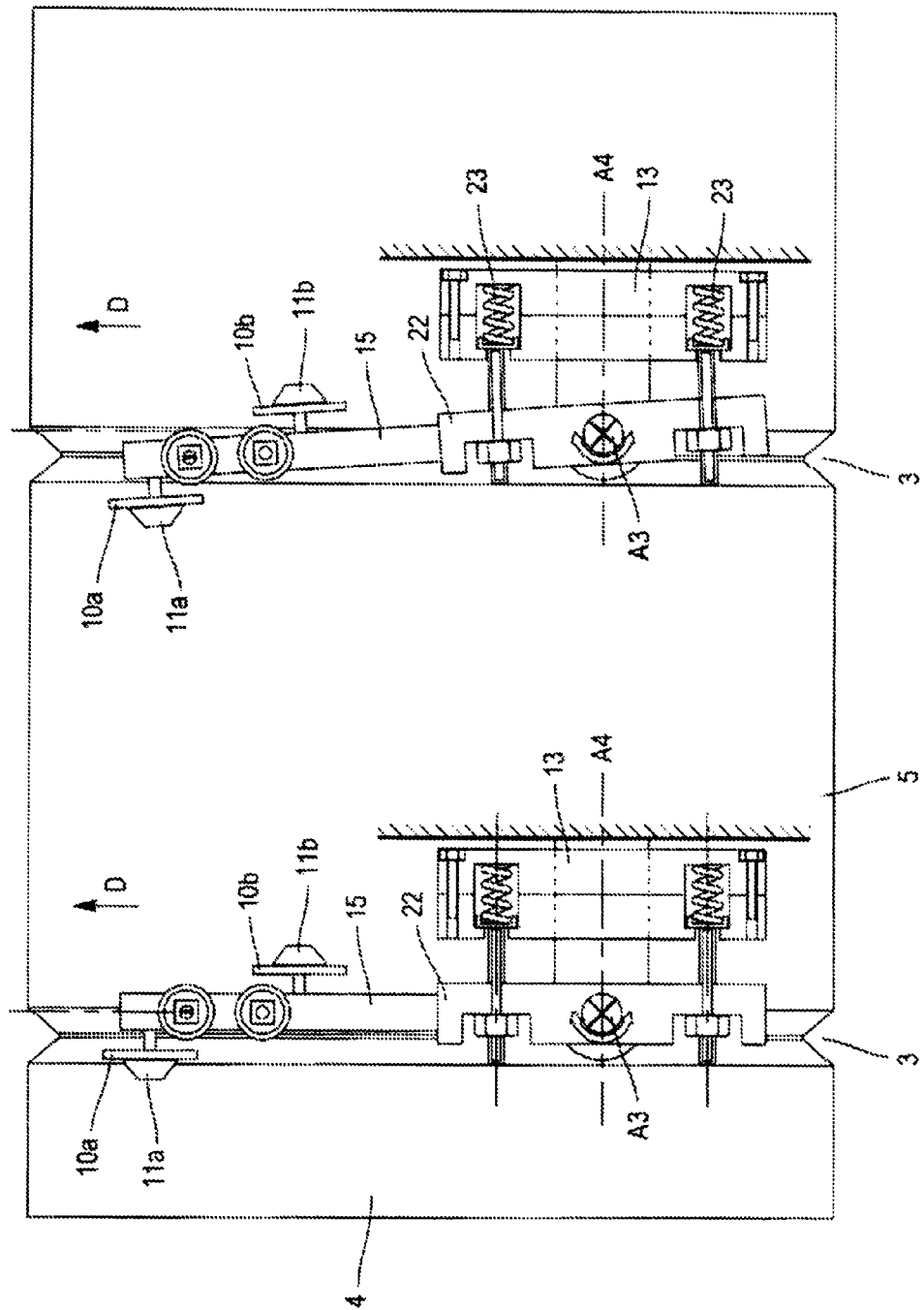
FIGS. 5a and 5b respectively show an extremely diagrammatical view of the top of an arm-secondary bug assembly mounted on a hub.
Figure 6:
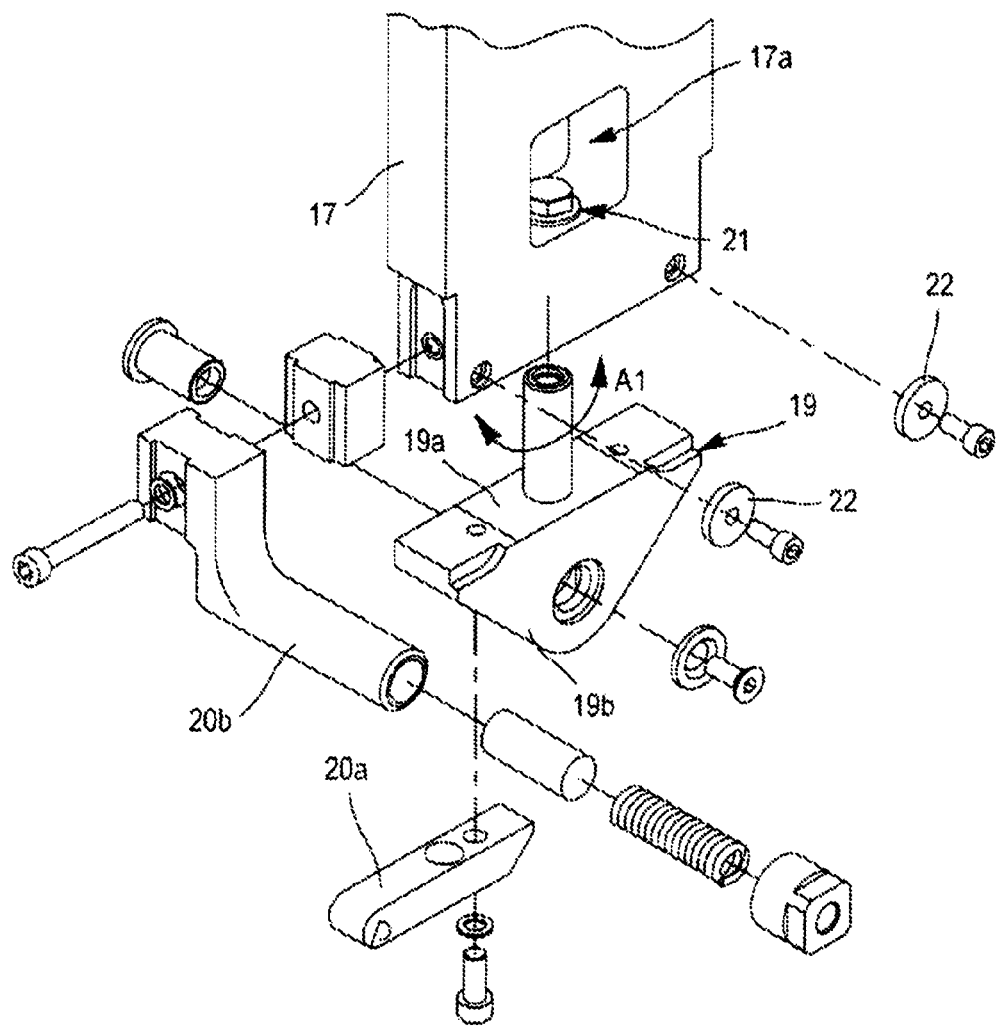
FIG. 6 shows an exploded perspective view of the jointed assembly at the pivot axis A1.
Figure 7:
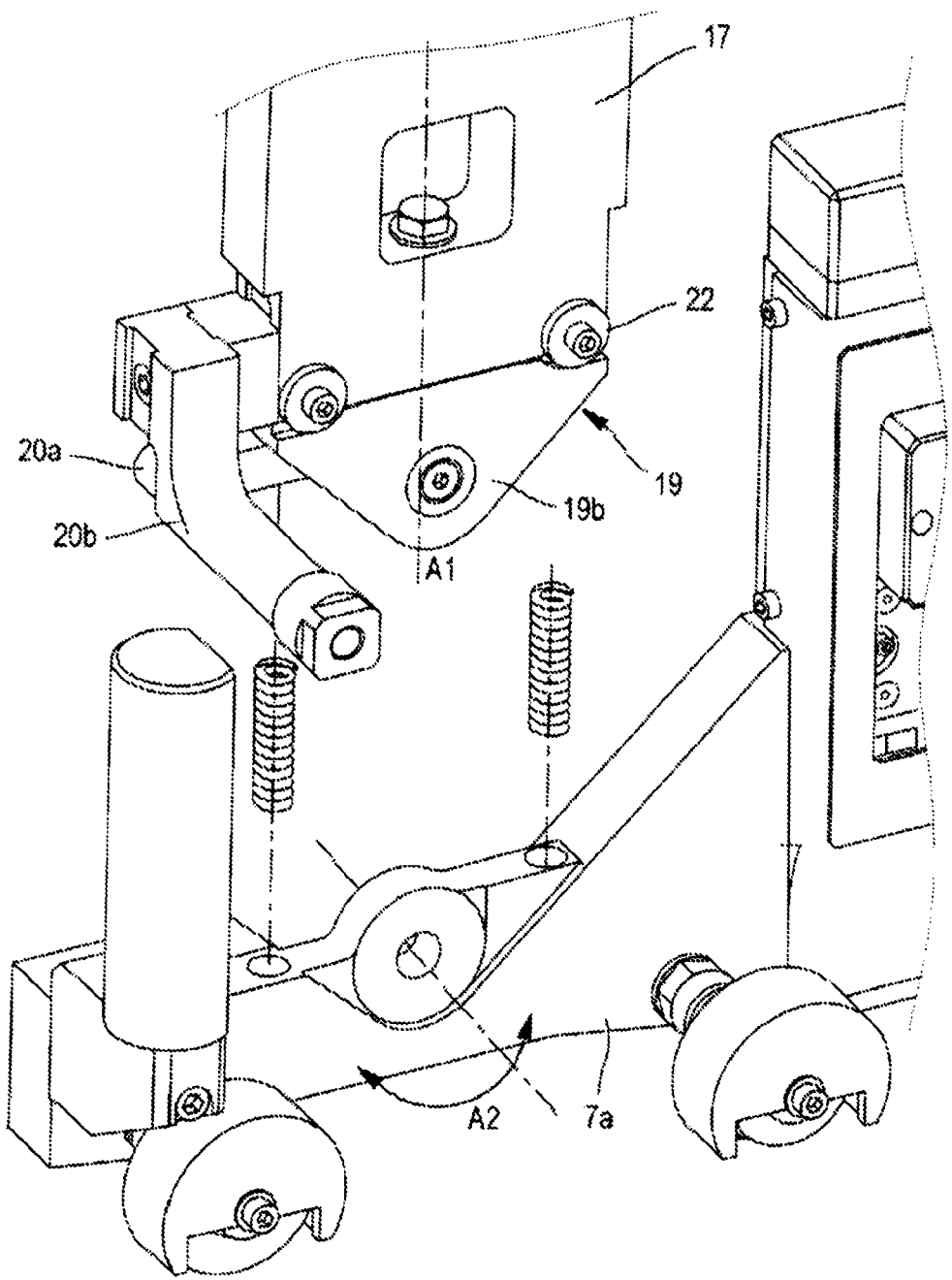
FIG. 7 shows an exploded perspective view of the jointed assembly at the pivot axis A2.

Thus the hub 13 holding the connecting arm 12 equipped with the secondary bug 7 can be pivoted on the one hand between a raised position of the secondary bug 7 relative to the groove 3 and a lowered position onto the groove 3. But furthermore, the pivoting movement of the arm 12, and therefore of the bug 7 and therefore of the guide system about the pivot axis A3 makes it possible to align the axis of said arm 12 with the axis of the groove 3 (see FIG. 5b) even when the axis of said arm 12 is slightly offset from the axis of the groove 3 (see FIG. 5a).

By pivoting the arm 12 about the axis A3, the guide system, which is slightly offset, repositions itself in the groove 3 in an appropriate manner. Once the welding is complete, the secondary bug 7 is raised and the pushing means 23 return the arm 12 to its original position.

In the example shown, the holder 8 holds two torches T1 and T2 located between the two tracer and roller assemblies 10a, 11a and 10b, 11b.

The holder 8 is removable from the secondary bug 7 as shown in the figure and it is also mobile relative to said secondary bug 7 so that the penetration depth of the electrodes E1 and E2 into the groove 3 can be adjusted after each weld pass. To this end, the holder 8 is mounted sliding along two slide rails held by the plate 7a of the secondary bug 7. For accurate adjustment of the penetration depth of the electrodes E1 and E2, stops of different heights are also provided, mounted on a rotating drum. A cylinder secured to the plate on the secondary bug 7 has its piston rod integral with the holder to move it along the slide rails in order to bring a pin of the holder 8 in contact with the stop selected on the drum. Furthermore, an oscillation movement can be imparted to the holder 8 with a frequency and amplitude adjustable by a mechanical or electrical means known per se.

In addition for greater accuracy and to manage the intensity. The wire length fed defines the resistance of the arc (R) and the arc voltage is kept constant by the generator (U). Acting on the wire length by moving closer to the weld bead makes it possible to reduce R, and moving away from the weld bead makes it possible to increase R, which constitutes acting on the intensity (I) value "HOM". The holder 8 holds two welding torches connected mechanically but independent in height, one of said welding torches T1 being fixed relative to the holder 8 and the other welding torch T2 being mobile relative to the holder 8 so that the penetration depth of said torch T2 can be adjusted relative to the fixed torch T1.

It is then possible to have two types of mechanism. In a first type, the first torch or initial torch is the fixed torch T1 on the holder 8, which makes possible an approach movement and management of the wire height fed while the second torch is the mobile torch T2, the relative movement of which independently of the movement of the first torch allows for management of the wire fed (cf. FIG. 8a).

Figure 8B:
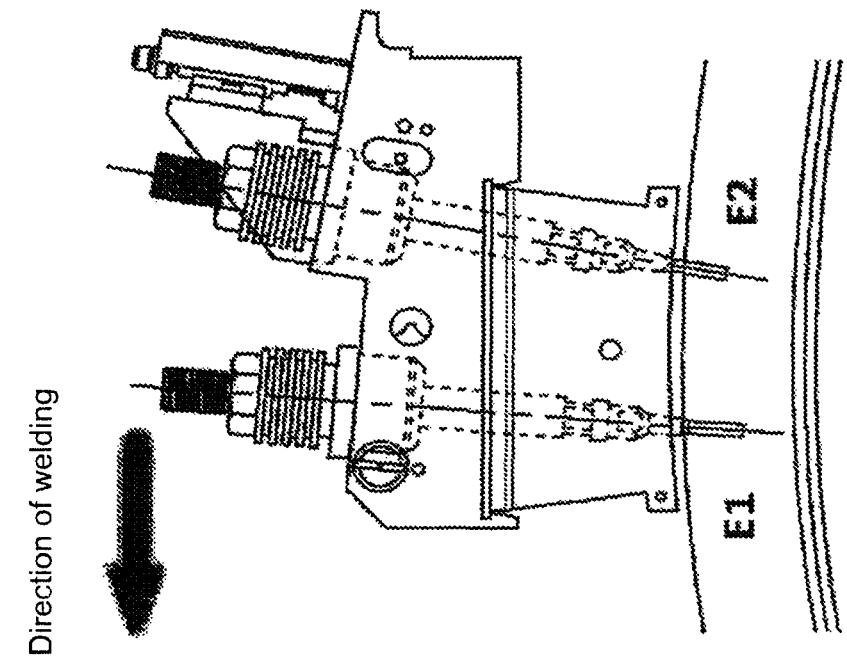
FIGS. 8a and 8b respectively show a side perspective view of a holder.
Figure 8A:
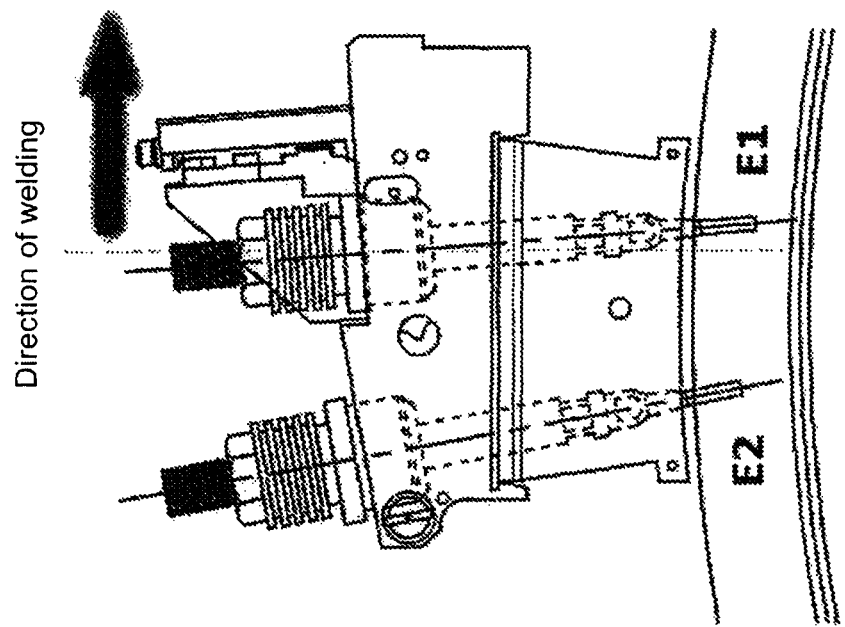

In the second type, the second torch is the fixed torch T1, which allows for an approach movement and management of the wire height fed while the first torch is the mobile torch T2, the independent movement of which provides management of the wire fed (cf. FIG. 8b).

The mobile torch T2 is mounted sliding along a slide rail 24 arranged on the holder 8.

The invention is of course in no way limited to the examples given, but also encompasses all of the variants as shown in FIGS. 9a to 9h.

Thus, FIGS. 9a and 9b show a holder holding two torches T1, T2 filed to the holder, it being possible for said holder to be fixed relative to a shop (Figure 9a) or mobile (FIG. 9b), which allows for wire length control.

The holder in FIGS. 9c and 9d holds a mobile torch and a fixed torch, said holder being fixed to a stop in FIG. 9c while the other torch, which can move up and down relative to the block, allows for wire length management on said torch.

In FIGS. 9e and 9f, the holder can move up and down and holds a fixed torch as well as a torch that can move up and down relative to the holder. Wire length management on both torches is therefore proposed.

In FIGS. 9g and 9h, a block is proposed that holds two torches that can move up and down on said block, with the block being fixed to a stop in FIG. 9g while in FIG. 9h it is mounted so that it can move both up and down.

The invention is of course in no way limited to the examples given.

Figure Text

7/8 8a/8b: Direction of welding

8/8 9a-9h: Mechanical stop
  Upper stop (parked) Movable up and down
  Direction of welding Mechanical stop cylinder

The invention claimed is:

1. An automatic mechanical guide system for one or more torches of a welding unit in a groove delimited by bevelled end surfaces of two metal parts to be welded together, comprising:
   a main bug that moves along a fixed guide more or less parallel to the groove;
   a secondary bug that is connected to the main bug by a jointed connecting assembly and includes a torch holder and a guide device comprising roller components in contact with surfaces of the metal parts bordering the groove and tracer components that enter into the groove;
   the guide device comprising a first tracer and roller assembly that is located at the front of the secondary bug, in a direction of movement of the main bug, and comprises a front tracer component in contact with one of two side walls of the groove and a front roller component rolling on the surface of one of the two metal parts on one side of the groove and a second tracer and roller assembly that is located at the rear of the secondary bug and comprises a rear tracer component in contact with the other side wall of the groove and a rear roller component rolling on the surface of the other metal part on the other side of the groove, the one of more torches then being mounted on the secondary bug so they are between the first and second tracer and roller assemblies;

the jointed connecting assembly comprising a first pivot axis that is perpendicular to the direction of movement of the main bug and is located in a plane parallel to a mid-plane of the groove and a second pivot axis that is perpendicular to the direction of movement of the main bug and perpendicular to the mid-plane of the groove, the first and second pivot axis being located between the first and second tracer and roller assemblies;

lateral pushing means being provided that act on the secondary bug to urge it to pivot about the first pivot axis so that each tracer component stays in contact with the associated wall of the groove and pushing means that constantly push the roller components on the secondary bug against the metal parts respectively associated with them; and a third pivot axis that is perpendicular to the direction of movement of the main bug and is located in a plane parallel to the mid-plane of the groove, the third pivot axis being outside the torch holder and pushing means being provided that act on the secondary bug to urge it to pivot about the third pivot axis so that an axis of the one of more torches is aligned with an axis of a join plane and the secondary bug then returns to its original position.

2. A system according to claim 1,
wherein the jointed connecting assembly comprises a connecting arm holding the secondary bug above the groove at one end, and an opposite end of which is mounted on the main bug by a hub, the arm being mounted pivoting on the hub about the third pivot axis perpendicular to the direction of movement of the main bug and located in a plane parallel to the mid-plane of the groove.

3. A system according to claim 2,
wherein the connecting arm, by the hub, is also mounted pivoting on the main bug about a fourth pivot axis, perpendicular to the join plane and the direction of movement of the main bug, it being possible to pivot the connecting arm in a plane substantially parallel to the mid-plane of the groove between a position in which it is lowered to bring the secondary bug onto the join plane to perform a weld and a position in which it is raised once the weld is complete.

4. A system according to claim 2,
wherein the connecting arm is fixed to the main bug by the hub, which holds a stirrup including flanges, the flanges of the stirrup respectively include an aperture in which is housed one end of the arm holding at its other end the secondary bug, a base of the stirrup being fixed to the hub so that it pivots about the third pivot axis, pushing means or springs being provided in the hub that act on the base of the stirrup to urge it to pivot about the third pivot axis.

5. A system according to claim 3,
wherein the hub comprises on its periphery a radially protruding tab at the end of which is mounted an end of a rod of a cylinder, actuation of the cylinder moving an end of the protruding tab in translation and causing the hub to be rotated relative to the main bug about the fourth pivot axis.

6. A system according to claim 2,
wherein the connecting arm includes an arm portion connected to a control unit on which is mounted a bracket holding the secondary bug.

7. A system according to claim 6,
wherein the control unit is configured to hold fastenings for filler wire feeders.

8. A system according to claim 6,
wherein a free end of the bracket forms a connecting part resting on a base of a stirrup, the first pivot axis being formed by a pivot, one end of which is integral with the base of the stirrup and extends perpendicular to it, the pivot passing through a bearing housed in a hole made in the end of the bracket so that its free end opens out into a central opening in the bracket, the free end of the pivot being threaded to receive a nut and thus axially immobilise the pivot.

9. A system according to claim 8,
wherein the second pivot axis is held by two flanges of the stirrup, and a plate of the secondary bug that holds the guide device is hinged on the second pivot axis.

10. A system according to claim 1,
wherein the secondary bug also includes a holder for at least one welding torch, the holder being mobile relative to the secondary bug so that penetration depth of the at least one welding torch into the groove is adjustable after each weld pass.

11. A system according to claim 10,
wherein the holder holds at least two welding torches mechanically connected by the holder, but mounted so that they are moveable up and down independently.

12. A system according to claim 11,
wherein the holder holds two welding torches, one of the welding torches being fixed relative to the holder and the other welding torch being mobile relative to the holder, or mounted sliding along a slide rail arranged on the holder so that the penetration depth of the torch is adjustable relative to the fixed torch.

* * * * *